(12) United States Patent
Sheehan

(10) Patent No.: US 8,793,097 B2
(45) Date of Patent: Jul. 29, 2014

(54) GRAPHIC ANIMATION OF GEOMETRIC DIMENSIONING AND TOLERANCING

(75) Inventor: Kenneth L. Sheehan, Ontario, NY (US)

(73) Assignee: Quality Vision International, Inc., Rochester, NY (US)

( * ) Notice: Subject to any disclaimer, the term of this patent is extended or adjusted under 35 U.S.C. 154(b) by 415 days.

(21) Appl. No.: 12/700,710

(22) Filed: Feb. 4, 2010

(65) Prior Publication Data

US 2011/0191057 A1 Aug. 4, 2011

(51) Int. Cl.
| | |
|---|---|
| *G06F 5/08* | (2006.01) |
| *G06F 5/06* | (2006.01) |
| *G01C 1/04* | (2006.01) |
| *G01C 7/06* | (2006.01) |
| *G06T 19/00* | (2011.01) |
| *G06T 13/20* | (2011.01) |

(52) U.S. Cl.
CPC ............... *G06T 13/20* (2013.01); *G06T 19/00* (2013.01); *G06T 2219/012* (2013.01)
USPC ............ 702/123; 702/122; 702/150; 702/153

(58) Field of Classification Search
USPC ........ 702/42, 82, 85, 155, 183, 189; 345/420; 700/109; 703/1
See application file for complete search history.

(56) References Cited

U.S. PATENT DOCUMENTS

| | | | | |
|---|---|---|---|---|
| 5,359,341 | A | * | 10/1994 | Hutchings ........................ 345/45 |
| 5,949,693 | A | * | 9/1999 | Tandler .............................. 703/1 |
| 6,847,922 | B1 | * | 1/2005 | Wampler, II ....................... 703/1 |
| 6,963,824 | B1 | | 11/2005 | Davidson et al. |
| 7,194,387 | B1 | * | 3/2007 | Filatov et al. .................. 702/189 |
| 7,536,654 | B2 | * | 5/2009 | Anthony et al. ............... 715/838 |

OTHER PUBLICATIONS

European Search Report dated May 22, 2012 (8 pages).
Juster et al.: Visualising the Impact of Tolerances on Cosmetic Product Quality, International Conference on Engineering Design ICED 01 Glasgow, Aug. 21, 2001 (8 pages).
DCS Engineering in New Dimensions: 3D Variation Analysis Product Sheet, ©2008 Dimensional Control Systems (1 page).
Dufaure et al.: A tolerancing framework to support geometric specifications traceability, The International Journal pf Advanced Manufacturing Technology, Springer, Berlin, DE, vol. 36, No. 9-10, Jan. 10, 2007 14 pages.
PC-DMIS 4.3 Reference Manual by Wilcox Associates, Inc. (pp. 1-2; 787-788; 929-930) Copyright © 1999-2001, 2002-2008 Hexagon Metrology and Wilcox Associates Incorporated; retrieved from the Internet on Aug. 16, 2008.
Hexagon Metrology website: PC-DMISReleaseDates (1 page) support.hexagonmetrology.us/link/portal/16101/16131/Article/388/PC-DMIS-Software-Versions-and-Release-Dates last version date Jan. 31 2014.

* cited by examiner

Primary Examiner — Sujoy Kundu
Assistant Examiner — Felix Suarez
(74) Attorney, Agent, or Firm — Brian B. Shaw, Esq.; Thomas B. Ryan; Harter Secrest & Emery LLP

(57) ABSTRACT

A graphical representation of a feature and associated tolerance includes a memory storing a description of the feature including at least one nominal dimension of the feature and an associated tolerance; a graphical representation of a nominal definition of the feature; and a graphical representation of the tolerance zones, derived from the nominal definition of the feature.

28 Claims, 16 Drawing Sheets

GRAPHIC ANIMATION OF GEOMETRIC DIMENSIONING AND TOLERANCING

BACKGROUND OF THE INVENTION

1. Technical Field

The present invention relates to geometric dimensioning and tolerancing. More specifically, the invention relates to graphical representation of features and their related geometric dimensioning and tolerancing constraints.

2. Description of Related Art

The ASME Y14.5 M geometric dimensioning and tolerancing standard (Y14.5) provides a symbolic language with which designers can specify design requirements for mechanical parts and assemblies. The range of tolerance types and shapes, combined with the concept of a fully or partially constrained datum reference frame, gives the designer complete control over the product definition. GD&T (Geometric Dimensioning & Tolerancing) symbols are combined to create a Feature Control Frame (FCF) that defines a specific part requirement.

The large number of permissible permutations/combinations of symbols leads to a problem for use of this symbolic design requirements language. Specifically, it is often difficult to comprehend exactly what requirement is imposed by a particular FCF construct. This is particularly true for people other than the original designer, such as the machinist who must manufacture parts conforming to the design requirement and the quality control specialist who must measure parts to verify conformance to the design requirements. Tolerance zone shapes, coupled with the concept of a partially constrained datum reference frame lead to complex tolerance zone boundaries, based on the nominal part structure that may change size, location or orientation depending on the exact combination of symbols used.

In some instances, the designer is also unaware of the particular FCF construct. Specifically, a novice designer may include dimensioning and tolerancing that is unnecessary, which leads to increased cost of manufacture and testing.

The conventional art includes products that limit the display of GD&T definition information to the display of degrees of freedom of the datum reference frame defined in the FCF. This is conventionally done by drawing a trihedral symbol to show the x-, y-, and z-axes of the datum reference frame and animating that trihedral symbol to show which degrees of freedom are unconstrained. However, this conventional arrangement does not display tolerance zones to the user.

There also exist training aides that illustrate the meaning of a subset of all possible constructs using a predefined example part, but these systems are deficient in that the cases that they illustrate are fixed and often bear no resemblance to the part to be manufactured or the preferred FCF of the part being designed.

Thus, there is a need in the art for an improved graphical representation feature with associated geometric dimensioning and tolerancing.

SUMMARY OF THE INVENTION

The present invention remedies the foregoing drawbacks of the conventional art.

In a first aspect, the invention relates to a graphical representation of a feature and associated tolerance, including a graphical representation of a nominal definition of the feature and a graphical representation of the tolerance zones, derived from the nominal definition of the feature.

In another aspect, the invention provides a method of graphically representing a part. The method includes providing nominal dimensions of the part and a feature of the part and tolerance information associated with the feature including at least one datum, graphically representing the part and the feature using the nominal dimensions, and graphically representing a datum simulator simulating to the viewer of the graphical representation the at least one datum of the feature.

In yet another aspect, the invention provides a graphical representation of a part having a feature, the feature having a nominal description and associated tolerance information including a datum. The graphical representation includes a graphical representation of the nominal description of the feature and a graphical representation of a datum feature simulator corresponding to the datum of the feature.

In still another aspect, the invention relates to a metrology method that includes the steps of providing a part description including a part feature and tolerance information, including at least one datum associated with the part feature, graphically representing the part and the part feature based on the part description, graphically representing the datum associated with the part feature, and deriving a metrology program from the graphical representation of the part description and associated tolerance zones to automate an inspection apparatus inspecting a physical embodiment of the part description.

These and other aspects, features, and objects of the invention may be had with references to the following description and accompanying figures, in which the preferred embodiments are described and shown.

BRIEF DESCRIPTION OF THE DRAWING FIGURES

DETAILED DESCRIPTION OF THE INVENTION

Preferred embodiments of the invention will now be described with specific reference to the figures.

Figure 1:
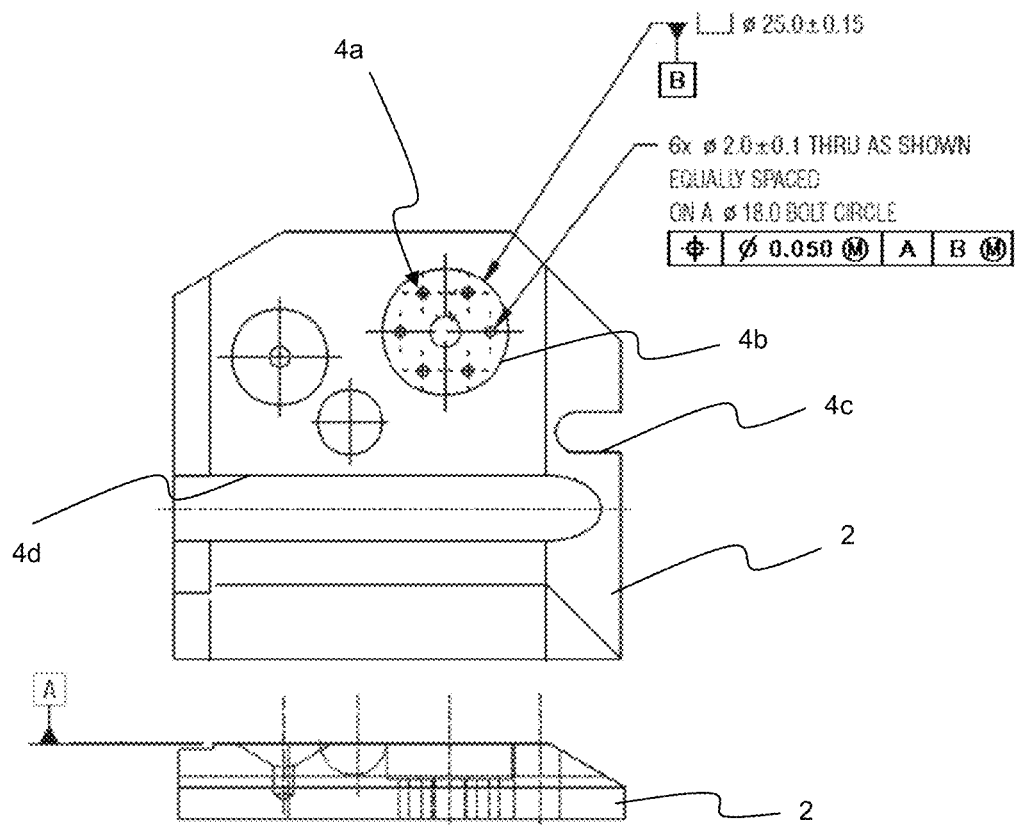
FIG. 1 is a drawing of a representative part.

FIG. 1 illustrates a part 2. The illustrated part 2 is an arbitrary and representative part; the invention is useful with any number of parts and is not limited to the illustrated part. The part preferably is designed for use with other parts in an assembly or as a stand alone part for some other use.

The illustrated part 2 has a number of features 4a-4d. As illustrated in FIG. 1, these features include a pattern 4a of six holes formed vertically through the part, a cylindrical bore 4b surrounding the six hole pattern 4a, a cut-out 4c formed vertically along an edge of the part, and a horizontal cut-out 4d on a top surface of the part and having a substantially semi cylindrical profile. Other features also are shown in FIG. 1. The illustrated part and features are merely representative, as any number of parts and/or features may be provided depending upon designer preference and functional requirements.

The part 2 is generally part of an assembly or the like and is designed with dimensions and tolerances that allow for assembly and cooperation of the part 2 with other parts of the assembly. A designer will generally design and describe the part and the part's features using conventional dimensioning and tolerancing. For example, a designer will provide nominal (basic) dimensions of the part and the features of the part with sufficient specificity to allow a machinist, metrologist or other manufacturer to make the designed part. Because some features are more critical than others, designers will use GD&T call outs and identifiers to ensure that the part's features are within critical tolerances, for example, to ensure that parts fit together or operate properly upon assembly.

Figure 2:
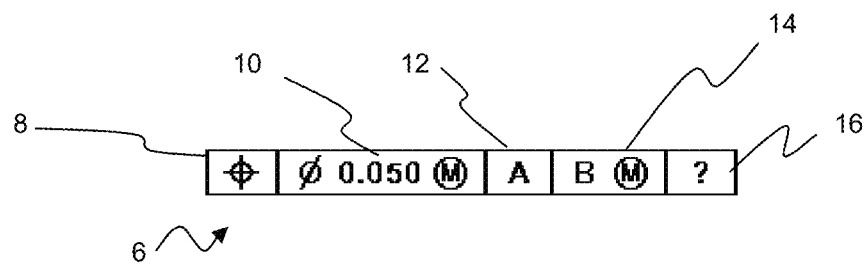
FIG. 2 is a conventional FCF.

Y14.5 prescribes the use of FCFs to convey GD&T requirements to a machinist, metrologist or other manufacturer. As is known conventionally, an FCF is associated with a considered feature and provides information regarding the dimensioning and tolerancing of that considered feature. An FCF includes a number of compartments, each conveying information about the GD&T. An exemplary FCF 6 is illustrated in FIG. 2. The FCF 6 includes a first compartment 8 containing a geometric characteristic symbol. The "Position" geometric characteristic symbol is shown in FIG. 2. Other geometric characteristics are defined by ASME standards, and include straightness, flatness, circularity, cylindricity, profile of a line, profile of a surface, angularity, perpendicularity, parallelism, concentricity, symmetry, circular run-out, and total run-out.

The second compartment 10 of the FCF 6 contains a tolerance, in this case, a diameter tolerance of 0.050. The second compartment 10 also may include a tolerance zone shape modifier and a material condition modifier. In FIG. 2, the diameter zone shape modifier and the Maximum Material Condition (MMC) modifier are illustrated. A Least Material Condition (LMC) or a Regardless of Feature Size (RFS) modifier could alternatively be illustrated after the tolerance in the second compartment 10. As is understood, including a material condition modifier is required by ASME standards for features of size.

Additional compartments also may be provided in the FCF. For example, in FIG. 2, a third compartment 12 containing a datum reference Letter A is included. A fourth compartment 14, including a datum reference letter B, is also provided. On engineering drawings of the part, each of the datums A and B referenced in the third and fourth compartments 12, 14, would be defined as a feature such as a surface, an axis, an edge, or the like. In FIG. 1, for example, datum A is defined as the top surface of the part 2 and datum B is defined as the cylindrical bore 4b. If the datum feature is a feature of size (as defined by Y14.5), a material condition modifier also may be included in the compartment, following the datum reference letter. In compartment 14 a maximum material modifier has been added. Additional datum features, specifically, a tertiary datum could also be defined on the drawing of the part and called out in the FCF in compartment 16. As is conventionally known, the basic dimensions (often together with associated size tolerance information) and FCFs are provided on an engineering drawing of the part to convey to the machinist, metrologist or other manufacturer the necessary dimensions and associated tolerances for the features of the part.

The present invention provides a useful tool for illustrating tolerance information associated with a feature, specifically including geometric dimensioning and tolerancing information contained in an FCF. In the preferred embodiment, the invention is embodied in a software program that incorporates known CAD modeling/rendering functionality, such as three-dimensional representation of parts and part features. Alternatively, the invention may be provided as add-on or companion software operating with existing CAD software to render graphics useful in aiding the user's understanding of the GD&T associated with the rendered part and features. More specifically, the present invention relates to three-dimensional graphical representations of parts, features, and associated tolerances presented on a user display, such as a computer monitor, or the like, using known rendering techniques. A designer uses conventional CAD or modeling programs to design parts and features rendered in three-dimensions and to produce corresponding two-dimensional engineering drawings of the designed parts and features. The invention supplements that capability by also showing to the user the effects of FCFs.

The invention now will be described further with specific reference to FIGS. 3 through 7.

Figure 3A:
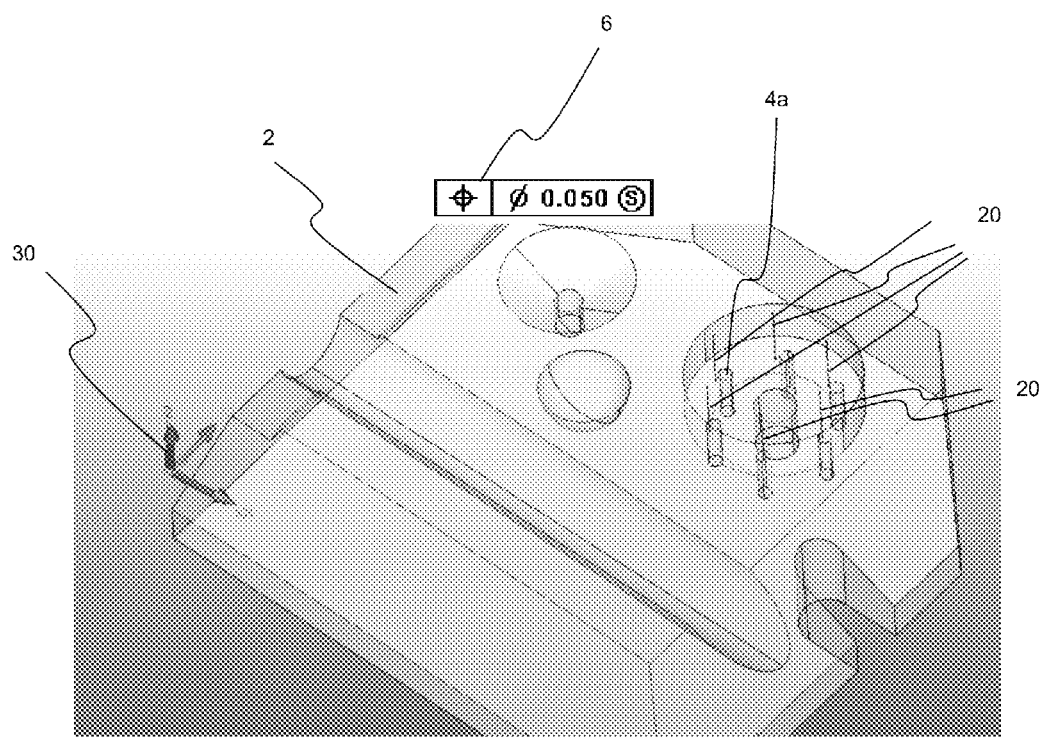
FIGS. 3A-3C are graphical representations of the part of FIG. 1 and FCFs associated with a feature of the part.
Figure 3B:
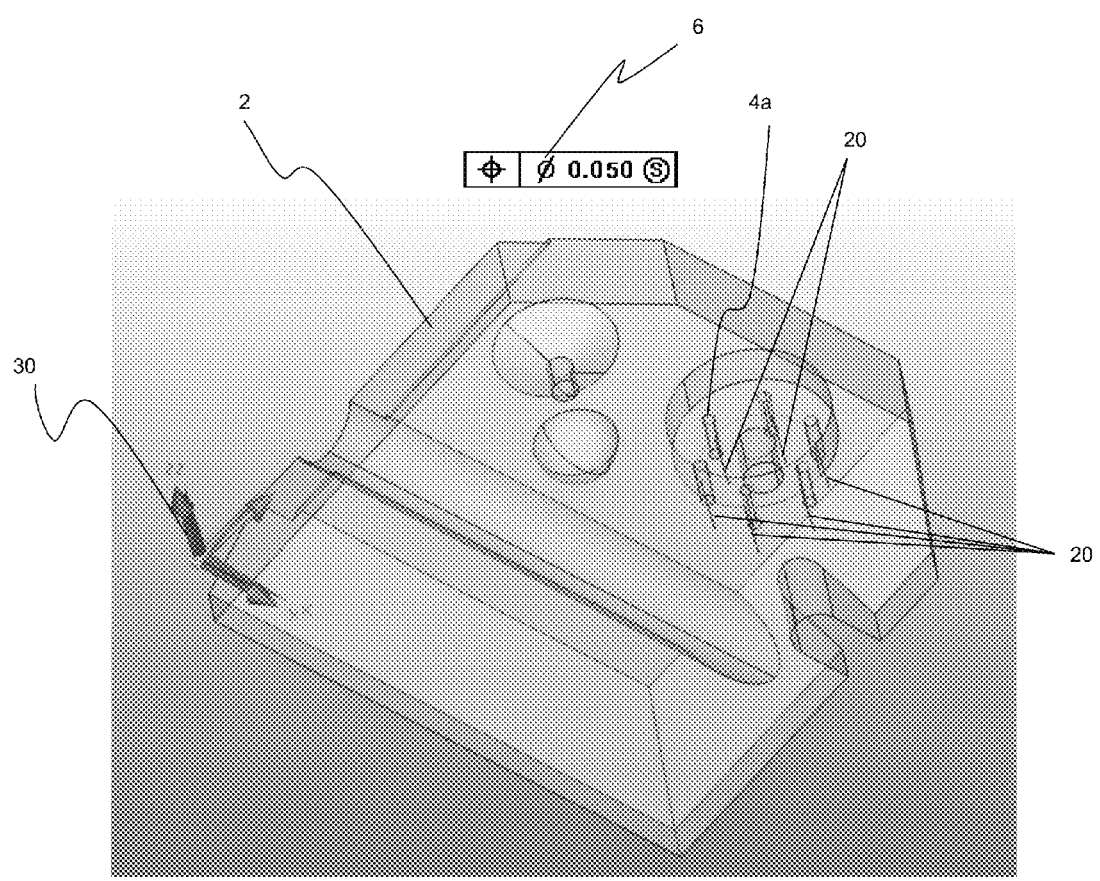
Figure 3C:
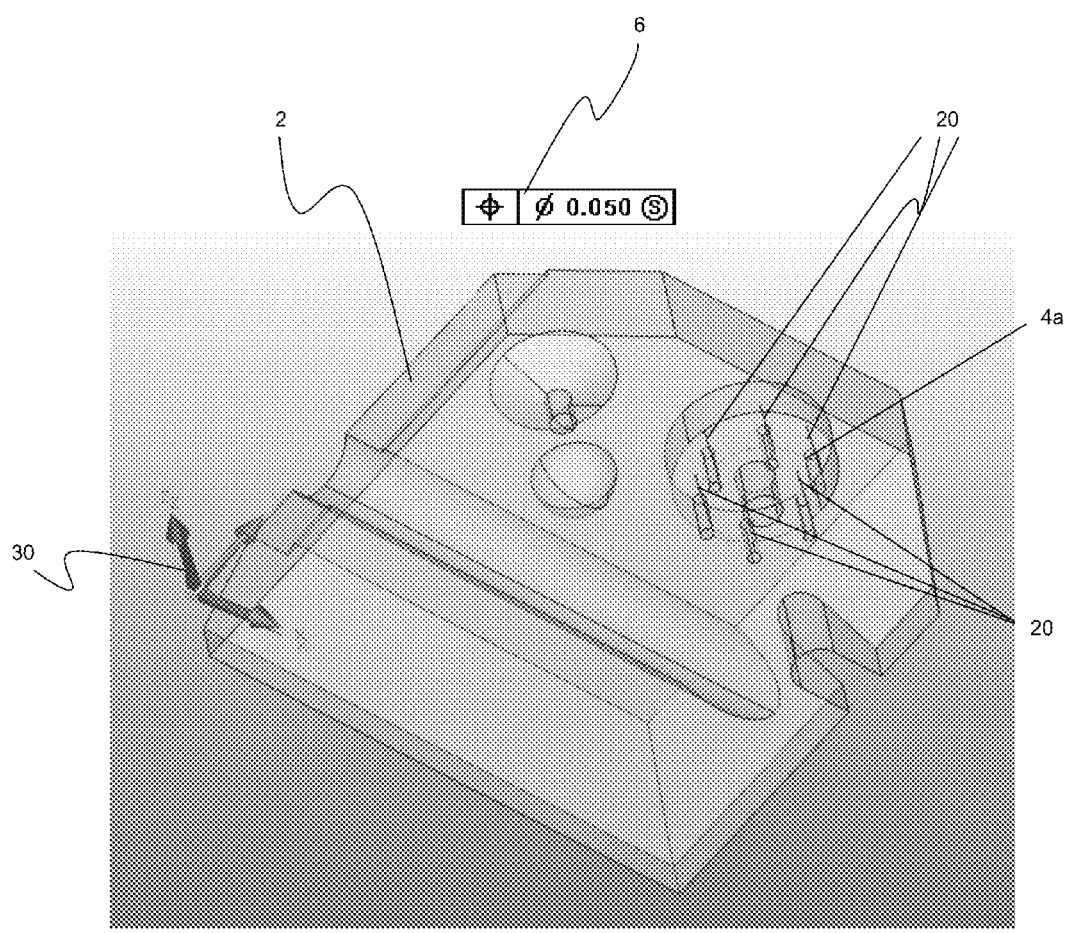

In FIGS. 3A-3C, a three-dimensional graphical or pictorial representation of the part 2 is provided. An FCF 6 also is illustrated. The FCF 6 provides GD&T information about the feature under consideration, in this case, the six-hole pattern 4a. Specifically, the FCF 6 recites that the six-hole pattern 4a is controlled by a positional tolerance with a diametrical (cylindrically shaped) zone having a diameter of fifty thousandths, regardless of feature size (RFS). Conceptually, because of the RFS modifier on the positional tolerance, the positions of the axes of the holes relative to each other must be met, regardless of the size of the holes. The present invention pictorially represents this concept to the user. Specifically, the part is first illustrated three-dimensionally on the graphical display using the nominal dimensions. Then, position tolerance zones 20 controlling the six holes are illustrated by graphically representing the tolerance zones 20 as cylinders closely surrounding the axes of the six cylinders in the defined positions. A trihedron 30 showing the x-, y-, and z-axes of the part also is graphically illustrated.

The present invention thus provides a graphical representation of the part and the associated tolerances associated with the part as defined by the FCF. Since no datums are associated with the GD&T position tolerance associated with the holes in the six hole pattern of FIGS. 3A-3C, the individual holes in the pattern must be correctly oriented and located relative to one another according to the basic dimensions, but the pattern of holes can be arbitrarily oriented and located and still comply with the defined tolerance. That is, the six-hole pattern could be moved anywhere on (or off) the part and could rotate about any or all of the x-, y-, and/or z-axes and still comply with the GD&T information provided in the FCF. In the preferred embodiment, this conceptualization is illustrated through an animation of the tolerance zones 20. More specifically, the tolerance is illustrated by animating movement of the axes of the holes in all six degrees of freedom, i.e., translation along the x-, y-, and z-axes and rotation about each of those axes. FIGS. 3A-3C show three positions of the tolerance zones 20 in the animation.

As noted above, there are conceptually no constraints on the extent of the movement of the six-hole pattern, but for the purposes of the invention, there is less value to the user if the animation shows positions of the pattern that are unintelligible or unviewable on the user's display. Accordingly, the present invention limits movement of the animation according to an artificial constraint imposed by the programmer. For example, instead of spinning the hole pattern 360-degrees about each of the x-, y-, and z-axes, as would be in accordance with the FCF, the animation shows a smaller rotation of the six hole pattern, for example, ten degrees in each direction about each axis. Similarly, although the six-hole pattern can be translated in any of the x-, y-, and z-axes an infinite distance, several positions of the pattern would be useless to the user, so the animation is made to move the pattern a limited distance in each direction. For instance, the pattern could be translated a distance corresponding to a portion of the linear size of the part. As will be appreciated, any angles of rotation or linear distances could be used, depending upon the preferred representation to the user.

Thus, the representation provided to a user by the invention illustrates the effect of the proposed FCF on the considered feature, i.e., on the pattern of holes. The graphical representation is of the nominal or basic part 2 including feature 4a, defined by the nominal or basic dimensions ascribed by the designer and an overlaying graphic illustrating how the feature, in this case, the position of the holes as illustrated by the cylindrical tolerance zones 20, can vary while still conforming with the dimensioning and tolerancing standards set forth in the FCF. In the example of FIGS. 3A-3C, the six tolerance zones 20 controlling the axes of the cylindrical holes are moveable about six degrees of freedom as a rigid body, that is the positional relationship between the tolerance zones is maintained. The trihedron 30 preferably also moves, in unison with the pattern to further illustrate the movement.

Figure 4:
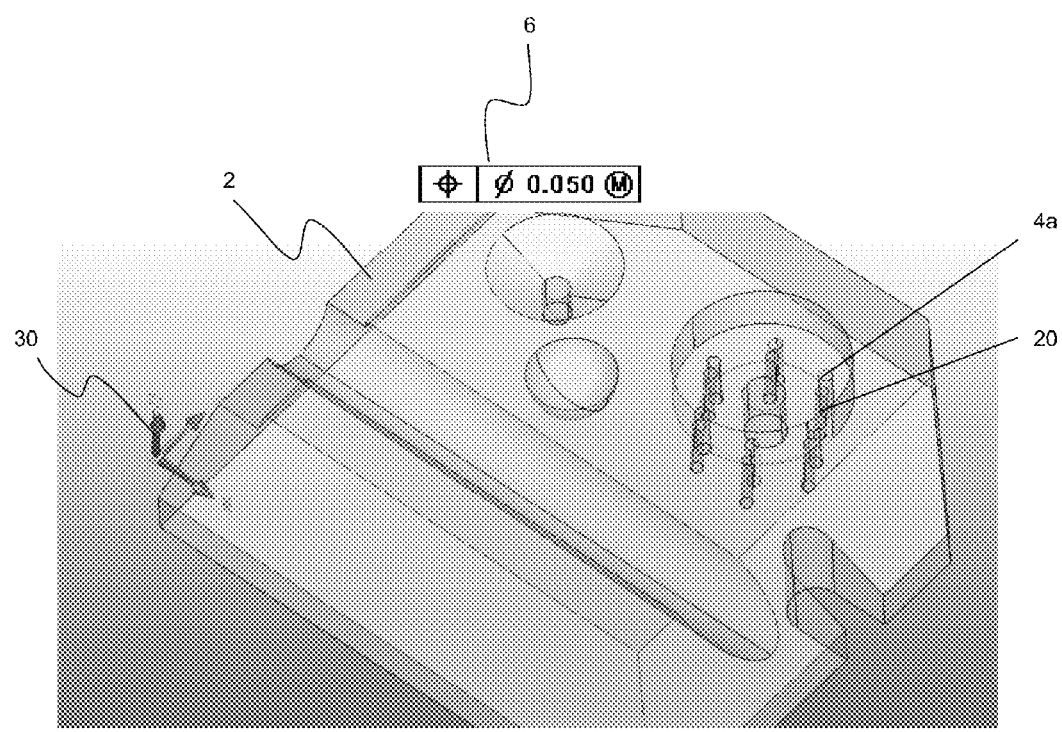
FIG. 4 is another graphical representation of the part of FIG. 1 and an FCF showing additional tolerance information.

In FIG. 4, a similar representation of the part 2 is provided, but with different GD&T information being provided in the FCF 6. Again, in this figure, the part 2 is graphically represented three-dimensionally to the user, as defined by the nominal or basic dimensions, including the holes at the basic size and position provided by the design. According to the FCF 6 of this embodiment, the position tolerance has a diametrical (cylindrically shaped) zone with a diameter of fifty thousandths. An MMC modifier is also included in this embodiment, instead of the RFS modifier of the previous example. As a feature of the invention, because the material condition modifier has been changed, the graphic representation of the tolerance zone 20 changes. In the previous embodiment, the RFS modifier was used, which does not link the size of the tolerance zone to the size of the considered feature. The MMC modifier, however, establishes a linkage between the size of the feature and the size of the tolerance zone. Specifically, as the size of the considered feature departs from its MMC (in the case of a hole this is the minimum diameter allowed by the considered feature's size tolerance) the position tolerance increases by a like magnitude. The size of the six holes, which is defined by the surfaces of the six holes, now affects the evaluation of the considered feature with respect to the tolerance. To illustrate this concept to a user, the tolerance zones 20 are now represented as a group of six larger cylinders, each having a diameter close to, but not greater than or equal to, the specified diameter of the considered feature. Thus, in this example, the six cylinders that have a slightly smaller diameter than the nominal or basic diameter are used to graphically represent the MMC modifier. These smaller (than nominal) cylinders conceptually represent cylinders at the smallest allowed diameter, which is the size at which the positional tolerance applies so the holes are evenly spaced. These smaller holes, however, indicate to the user that if the holes get bigger, i.e., are nominal or even larger in size, the positional tolerance will increase. This is a different depiction than that used for the RFS case, in which the tolerance zone cylinders were shown with diameter close to but not equal to zero. Obviously, the material modifiers are graphically represented by showing cylinders of varying size formed about axes to convey to the user the positional tolerance information. According to the invention, a least material condition (LMC) would be similarly displayed, except holes that are larger in diameter than the nominal dimension would be used to illustrate the condition. In the preferred embodiment, the RFS zones are drawn at 20% of the considered feature's nominal size, MMC and LMC zones are drawn at the considered feature's nominal size plus or minus 20% depending on the inside/outside and material condition modifier sense. These are illustrated in Table 1:

TABLE 1

| Material Condition Modifier | Inside Feature (Hole/Slot) | Outside Feature (Shaft/Tab) |
|---|---|---|
| RFS | 20% of size | 20% of size |
| MMC | 80% of size | 120% of size |
| LMC | 120% of size | 80% of size |

Although the inventor has found these sizes to be useful, i.e., perceptible, to the user to demonstrate the material condition modifiers, they are arbitrary. Other sizes could be used to illustrate the zone as long as a differentiation is made between the Material Condition Modifiers. Moreover, the size of the zone could change depending on the size of the feature, i.e., 5% of nominal feature size could be used for relatively larger feature sizes but 25% of nominal feature size could be used for particularly small features on a larger part. The purpose of the zones is to convey to the user the fact that a material condition modifier applies to the part; other visual aids could be used. For example, shafts or axes of different colors could be used to show the different conditions.

Because in FIG. 4, as in FIG. 3, no datums have been defined, the six cylinders representing the tolerance zones 20 of the six holes are free to move in any or all six degrees of freedom while still conforming to the tolerancing information, including the MMC. As in FIG. 3, this concept is illustrated by moving the tolerance zones 20 as a single entity, about all six degrees of freedom. Also as with FIG. 3, to increase the utility of the animation to the user, not all permutations or positions are illustrated, only a limited range of motion in each degree of freedom.

Figure 5A:
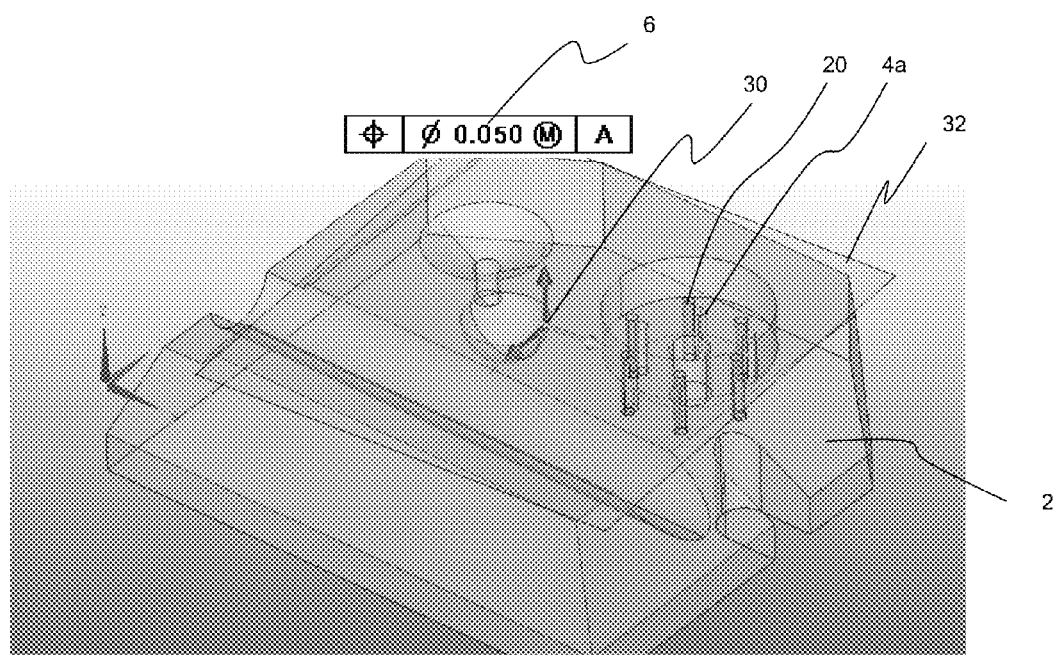
FIGS. 5A-5C are other graphical representations of the part of FIG. 1 with an associated FCF.
Figure 5B:
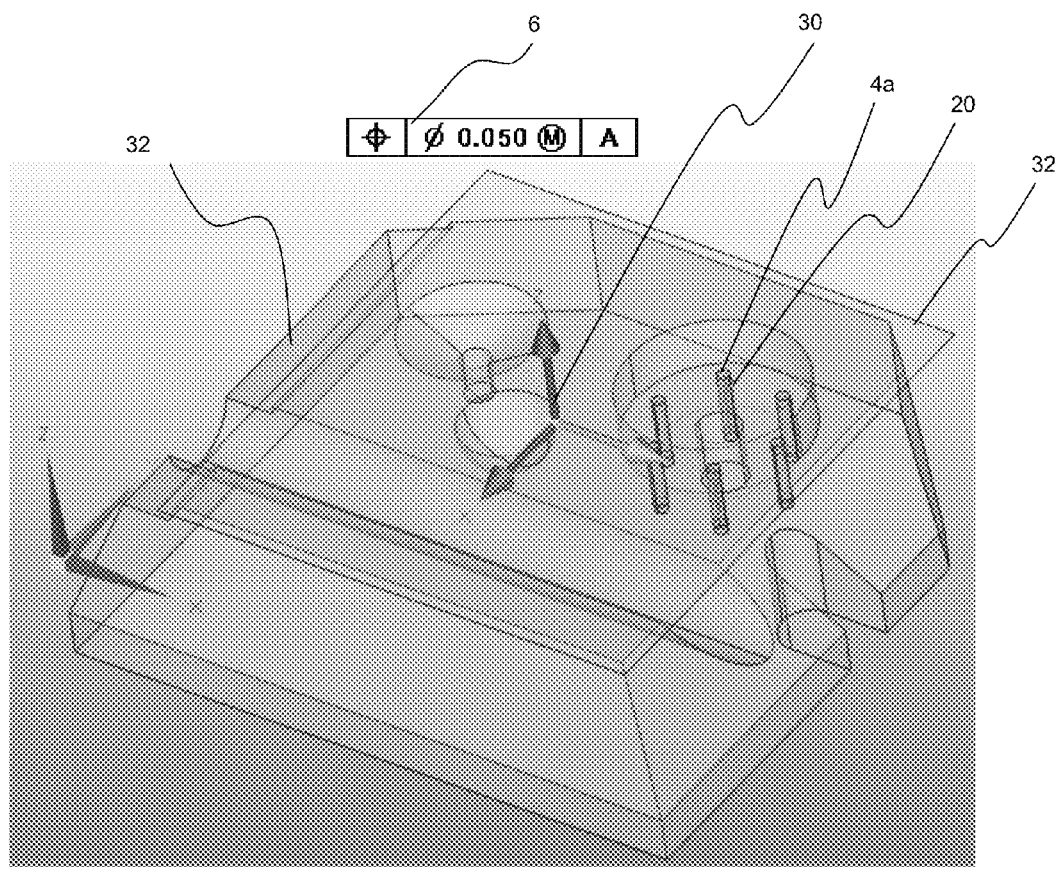
Figure 5C:
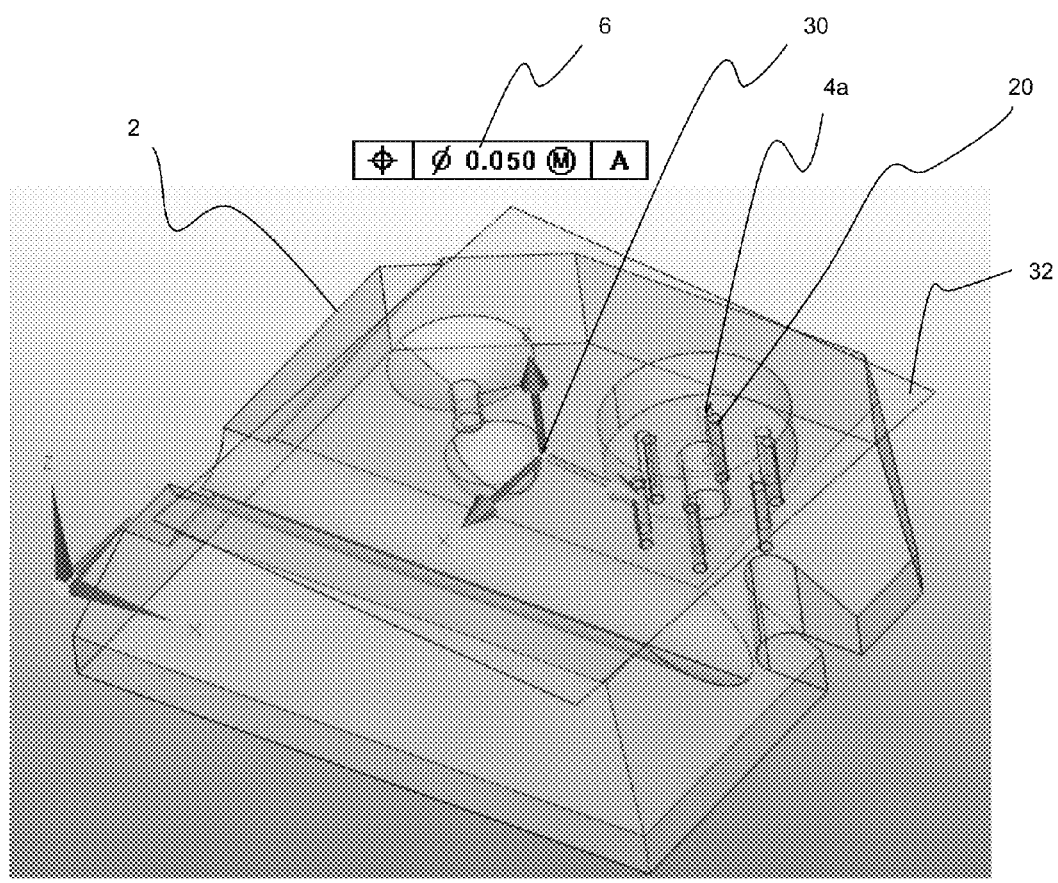

Although the previous two examples do not include datum references, many FCFs rely on datum references. More specifically, a datum is provided that is the surface from which the basic dimensions and tolerances should be measured. An illustration of the application of datum references to the present invention is illustrated in FIGS. 5A-5C. The primary datum A has been added to the FCF 6. From the machine drawing of the part (illustrated in FIG. 1), it can be seen that the datum feature A corresponds to the top surface of the part. All other information in the FCF 6 is the same as illustrated in FIG. 4.

The graphical representation in FIGS. 5A-5C is changed from that of FIG. 4 to illustrate the addition of datum reference A. More specifically, a datum feature simulator 32 illustrates the datum A on the graphical representation of the part. As is generally understood, the reference to a datum A that is a surface is actually a reference to an imaginary plane, in this case, a plane coincident with the upper surface of the part. While the plane could be any size, in a preferred embodiment of the invention, the graphic representation of the datum simulator 32 is derived from the graphic representation of the part 2, and is shown as a feature of similar shape, extent (length and width) and orientation as the actual datum, i.e., the top surface of the part 2. The addition of datum A limits movement of the holes. That is, movement is no longer unfettered in all directions, but is constrained in three dimensions, namely translational along the z-axis and rotational about the x- and y-axes. The addition of datum A thus leaves only three degrees of freedom, namely translation along the x- and y-axes and rotation about the z-axis, as shown in FIGS. 5A-5C.

FIGS. 5A-5C also graphically represent the trihedron 30 illustrating the coordinate axis system. The trihedron 30 is formed at the centroid of the datum simulator 52, although it could be anywhere on or off the part 2.

According to the invention, the tolerance zones of the six holes, that is, the cylindrical zones defined by the first two compartments of the FCF and their associated axes, are animated to show the degrees of freedom. In FIGS. 5A-5C, three different position of the tolerance zones are shown, to illustrate the animation in which the tolerance zones are shown to a user moving as a single body translationally along the x- and y-axes and rotationally about the z-axis. The datum feature simulator 32 and the trihedron 30 preferably also move, with the tolerance zones 20, to enhance the visual aesthetic. Of course, it is not necessary that either or both of the simulator 32 and the trihedron 30 move. As with the other exemplary embodiments, the representation to the user includes the part and feature defined by nominal or basic dimensions, as well as the tolerance zones, the datum simulator, and the trihedron, to display to the user the meaning of the FCF.

Figure 6:
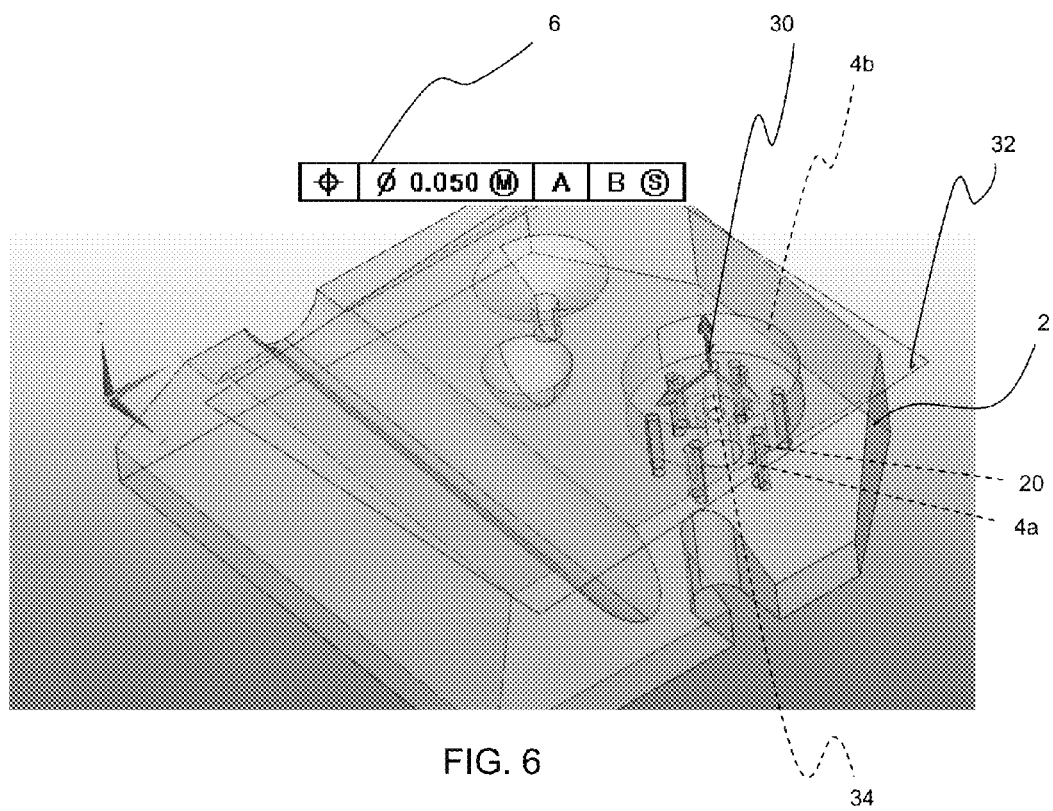
FIG. 6 is another graphical representation of the feature of FIG. 1 with yet another associated FCF.

FIG. 6 illustrates another example of the invention. Specifically, the representation shown in FIG. 6 is identical to that shown in FIGS. 5A-5C, but further includes a secondary datum B in the FCF, with an RFS Modifier. The secondary datum B is the upper, larger central cylinder 4b. A cylindrical datum simulator 34 closely surrounds the axis of datum B. In this case, the diameter of the datum simulator 34 equals 20% of the size of the cylinder that is datum B. This representation indicates that it is the axis of datum B that establishes the origin of the datum reference frame. As with the primary datum simulator 32 associated with datum A, the graphic representation of the datum simulator 34 associated with datum B is derived from the graphic representation of the part, and is shown as a feature of similar shape, extent (length) and orientation as the actual datum itself. Conceptually, adding the secondary datum B to the FCF ties the six holes to a positionally central axis, thereby further constraining movement of the holes by eliminating the translational degrees of freedom along the x- and y-axes. To illustrate this, the tolerance zones 20, the datum simulators 32, 34, and the trihedron 30 are shown, animated as a rigid body exhibiting rotation about the z-axis. Of course, movement of just the tolerance zones or the tolerance zones and the datum simulators could be animated.

Figure 7A:
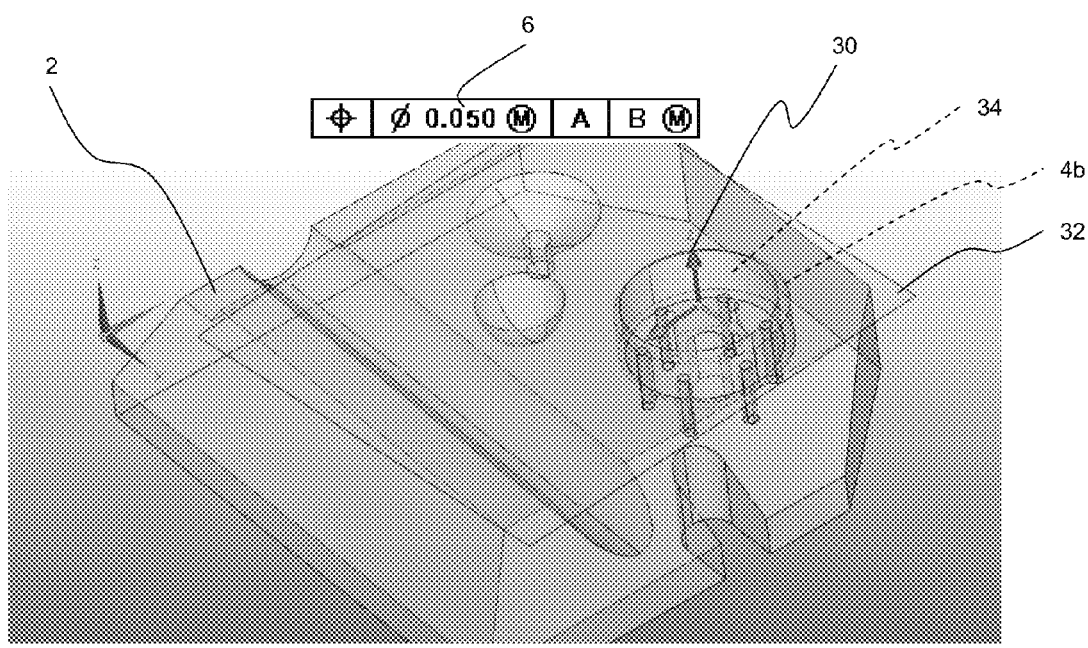
FIGS. 7A-7C are still other graphical representations of the part of FIG. 1 and still another associated FCF.
Figure 7B:
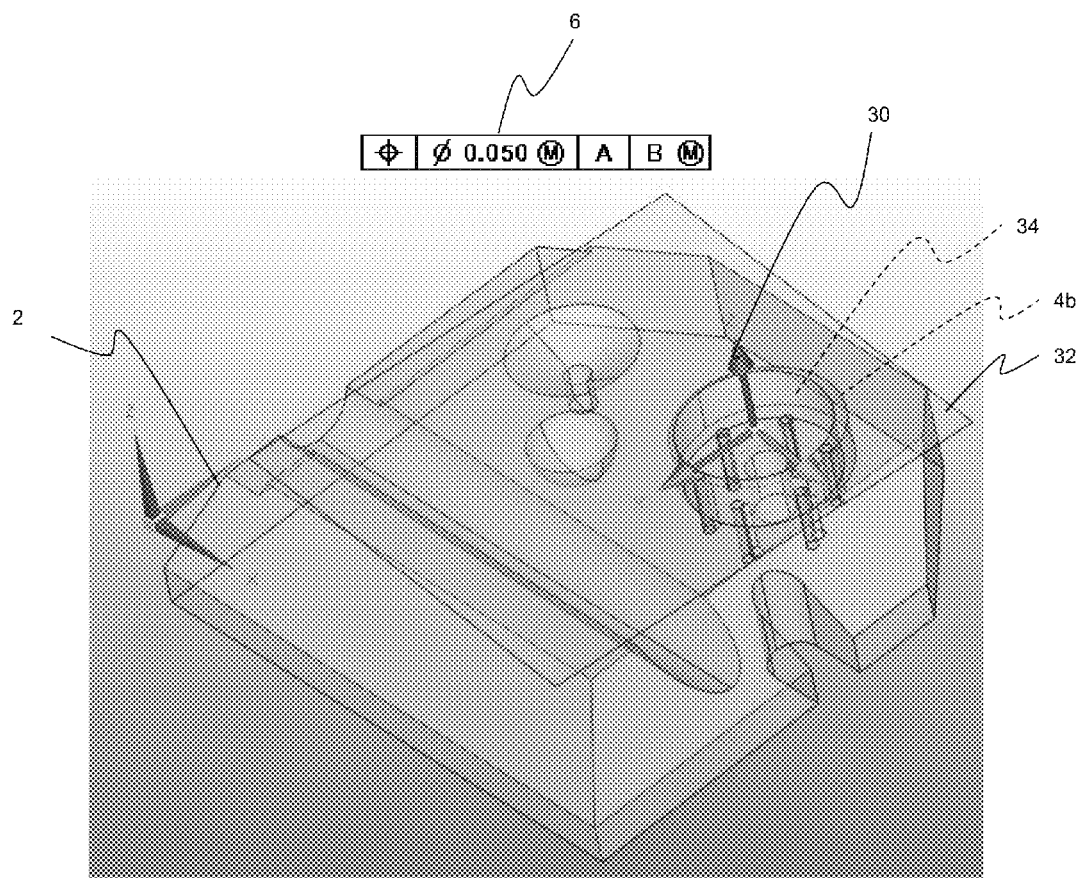
Figure 7C:
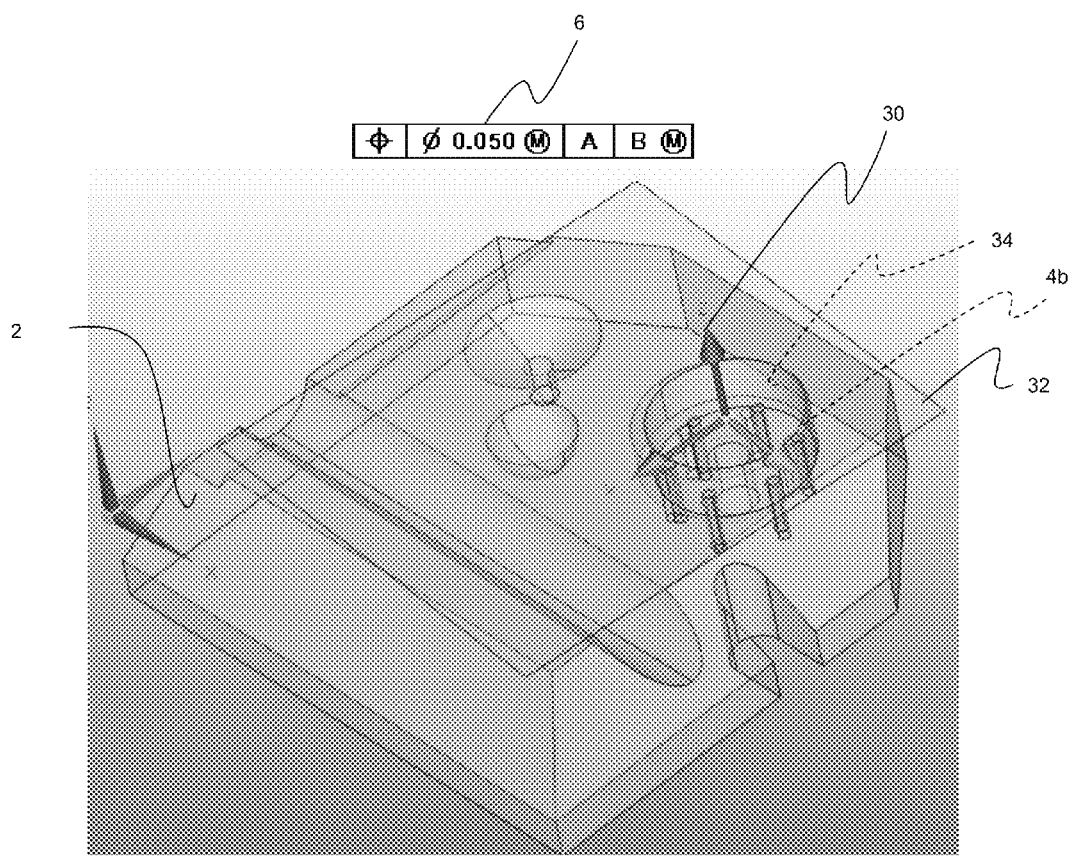

In FIGS. 7A-7C, an FCF 6 substantially identical to that shown in FIG. 6 is provided, except that a maximum-material condition has been added to the secondary datum B. A cylinder with a diameter close (in this example 80% of the nominal) to the diameter of the cylinder 4b that represents datum B (as opposed to the cylinder's axis, as in FIG. 6) graphically illustrates a datum simulator 34 showing the effect of the MMC modifier on datum B. This cylinder controls the location and orientation of the datum reference frame corresponding to B. Conceptually, adding the MMC allows for three degrees of freedom, namely limited translation in the X and Y directions and complete rotation about the Z axis. Translation is limited to positions in which the datum simulator 34 corresponding to datum B is completely within or contacts the nominal cylinder 4b. Thus, the invention represents the datum simulator 32 associated with datum A as a plane coincident with the top surface of the nominal part and the datum simulator 34 associated with datum B as a cylinder with diameter close to the diameter of datum B. Furthermore, animating the tolerance zones as represented by the three different positions of the tolerance zones in FIGS. 7A-7C shows the three degrees of freedom. Preferably, the tolerance zones 20, the trihedron 30 representing the axis system and the datum simulators 32, 34 are animated as moving as a rigid body; however, more or less of these may be fixed and others animated to show the degrees of freedom and graphically represent the described tolerance.

As illustrated in FIGS. 3 through 7C, the present invention provides graphical representations of complex GD&T concepts. The application is extremely helpful for manufacturers and machinists to make the part to specification, for part designers to understand what a tolerance callout means to the physical part, and to quality control specialists who have to inspect parts made to conform to the drawings. According to the invention, a user can gain an appreciation for what each component of the FCF actually means, and the user is provided with a graphical representation of both the shape and nature of the tolerance zones. Of particular benefit, the machinist can appreciate the entirety of the FCF, for example, from the graphical representation of FIGS. 7A-7C, while the designer and the quality control specialist can opt to build the graphical representation using the software application in step-by-step fashion by applying each discrete part of the tolerancing information contained in the FCF. In this manner, the designer and the quality control specialist can obtain a better appreciation for what each piece of information means to the construction of the part.

Figure 8A:
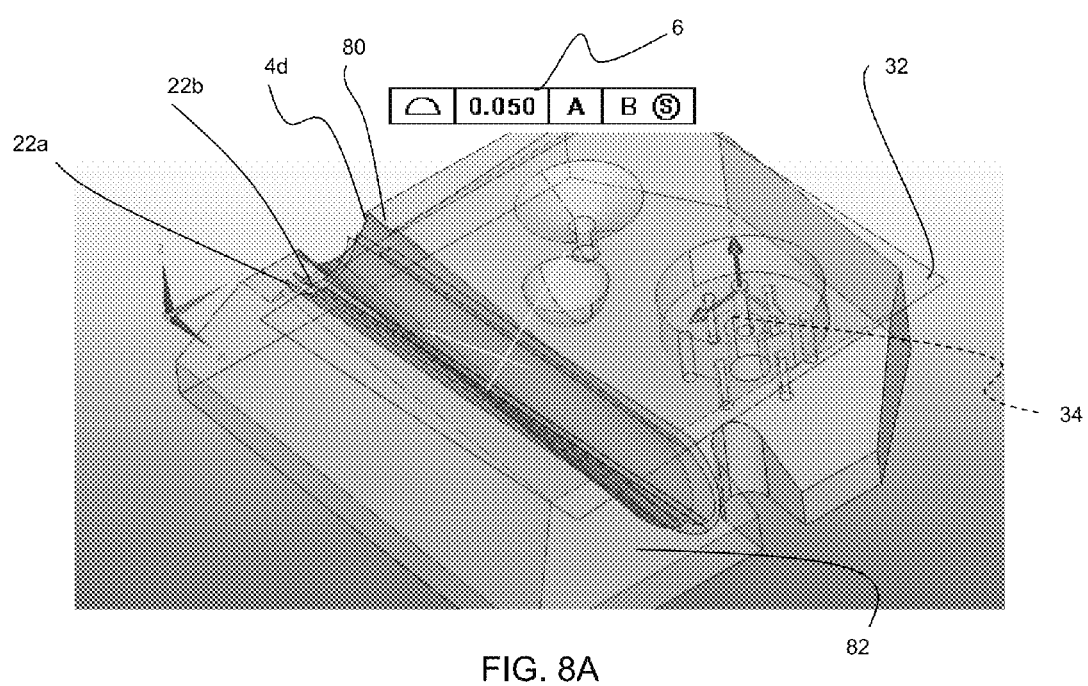
FIGS. 8A-8C are yet other graphical representations of the part of FIG. 1 with an associated FCF relating to another feature of the part.
Figure 8B:
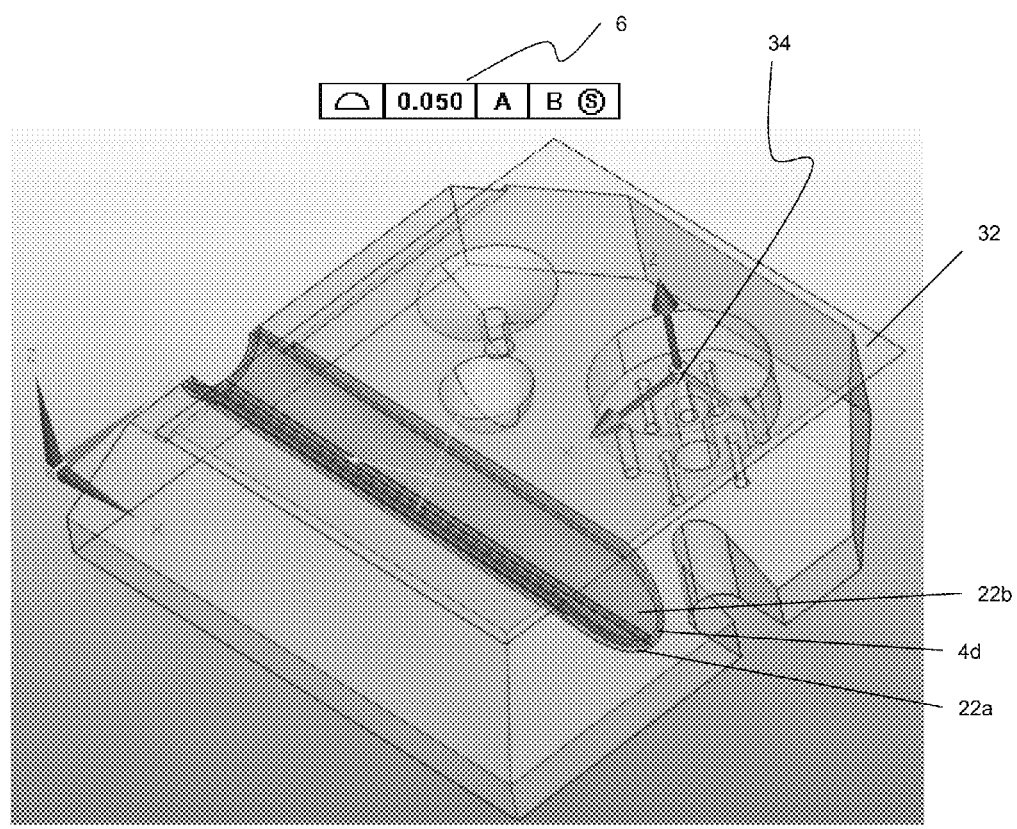
Figure 8C:
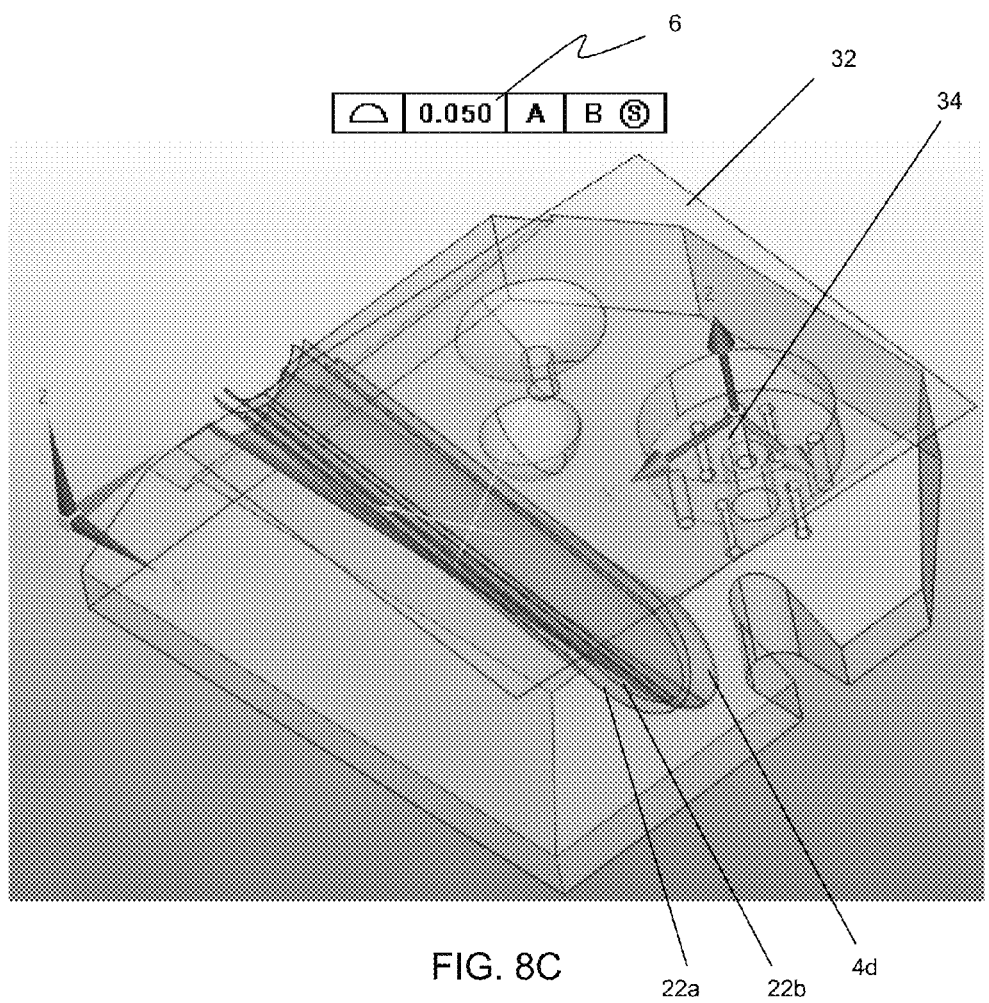

Although the foregoing examples related to a six-hole pattern 4a with an FCF having a positional tolerance, the invention also is applicable to other features of the part. FIGS. 8A-8C show such an example. In FIGS. 8A-8C, the considered feature 4d is a semi-cylindrical cut-out in the top surface of the part, and the FCF 6 includes a profile requirement with a fifty-thousandths tolerance relative to datums A and B. All points on the surface of the considered feature must lie between a set of surfaces, offset +/−0.025 from the surface of the considered feature 4d. In this example, the tolerance zone 22 is illustrated to the user on a three-dimensional rendering of the part as two surfaces 22a, 22b substantially identical in shape to the feature 4d, but offset from the feature in both directions perpendicular to the nominal surface. Because of the datums, which are identical to those in FIG. 6 and are shown in the representation using datum simulators 32, 34, as in FIG. 6, the tolerances zone 20 can move only rotationally about the z-axis. This is animated to the user, and FIGS. 8A-8C show different positions in that animation.

Although the part and the feature preferably are drawn to scale based on their nominal definitions, the size of the graphical representations of the datum simulators and tolerance zones preferably are not to scale. Specifically, because tolerance values typically are small compared to nominal dimensions, it is preferable that tolerance regions be graphically represented to optimize visualization to the user, usually by exaggerating the tolerance zone. Thus, in FIGS. 8A-8C, the surfaces representing the tolerance zones preferably are offset more than 0.025 from the nominal surface, so a user can readily differentiate between the nominal and offset surfaces.

As another feature of the invention, the offset surfaces used to graphically represent the tolerance zone boundaries preferably are formed by transforming a replica of the nominal surface. For example, in FIGS. 8A-8C, the offset surfaces 22a, 22b, both inner boundary and outer boundary, include all the features of the nominal surface, including the step 80 formed proximate the back of the part and the angled profile 82 at the front of the part.

As noted above, the present invention can be used by designers, machinists, and quality control specialists to better understand tolerance information. In the case of quality control specialists, they can use this invention to derive metrology methods for testing part conformity. As an example, in the case illustrated in FIG. 7, the quality control specialist can see that the evaluation of the six hole pattern can be influenced by the correctness of the determination of the size of datum B as defined by its surface. The specialist can therefore take steps to assure that sufficient data is sampled from the surface of B with an appropriate sensing technique, so as to minimize the uncertainty of this size determination. Moreover, the invention provides a logical progression through an FCF. More specifically, the invention first renders the part, then overlays a tolerance zone, in accordance with the first two compartments of the FCF. Next, datum simulators are added in accordance with datum callouts, and the animation is performed, illustrating the degrees of freedom.

Figure 9:
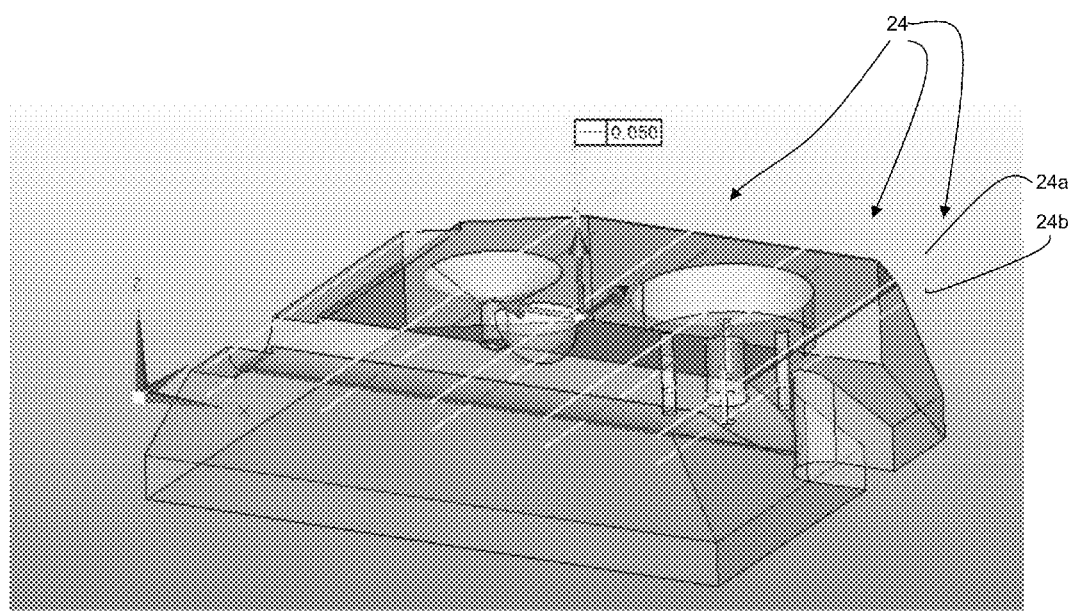
FIG. 9 is another graphical representation of the part of FIG. 1 with an associated FCF relating to another feature of the part.

Although the previous examples related to tolerances whose boundaries are three dimensional surfaces, the invention is also applicable to tolerances whose boundaries are two dimensional. FIG. 9 illustrates such an example. The FCF 6 applied to the top plane of the part includes a "straightness of line element" requirement with a fifty-thousandths tolerance. All points lying on an individual linear cross sectional slice ("line element") across the plane must lie between a pair of parallel lines separated by a gap of fifty-thousandths. All "line elements" must be parallel to one another, oriented as defined by the drawing view in which the FCF occurs. Each tolerance zone 24, depicted as a pair of parallel lines 24a, 24b, may assume a different orientation based on the slope of the "line element" to which it applies. That is, if there is a gradual twist in the top plane, then each straightness zone may be independently oriented so as to minimize the straightness error for its associated "line element". The graphic representation of each tolerance zone (in this case, each pair of parallel lines) is oriented to show the direction of the line elements and is animated with independent rotation about the x-axis and independent translation in y and z to illustrate to the user that each tolerance zone may assume a different attitude to determine the straightness of the line element. As with other embodiments, although the pair of lines could be separated by 0.050, each 0.025 above and below the surface to correspond to the tolerance, the spacing likely will be larger, to better show the tolerance zone. A plane could also be illustrated between the parallel lines, as another way to show the zone.

As illustrated and described for the foregoing examples, the invention provides a means to demonstrate complex GD&T principles to a user. The invention is not limited to showing only position, profile of a surface, and straightness of a line characteristics, however. In fact, the invention can demonstrate any surface characteristics. As demonstrated above, a position (cylindrical) tolerance zone is preferably illustrated as a cylinder, a profile of a surface tolerance zone is preferably illustrated as offset surface, and a straightness tolerance zone is preferably illustrated as two parallel lines. Table 2 demonstrates the preferred graphic for each tolerance zone:

TABLE 2

| Characteristic | Feature Control Frame | Tolerance Zone Graphics |
| --- | --- | --- |
| Straightness | — X.XXX | Parallel Lines |
| Flatness | ▱ X.XXX | Parallel Planes |
| Circluarity | ○ X.XXX | Concentric Circles |
| Cylindricity | ⌭ X.XXX | Coaxial Cylinders |
| Profile of a Line | ⌒ X.XXX | Offset Curve(s)* |
| Profile of a Surface | ⌓ X.XXX | Offset Surface(s)* |
| Angularity (Planar Zone) | ∠ X.XXX | Parallel Planes |
| Angularity (Cylindrical Zone) | ∠ ⌀X.XXX | Cylinder |
| Perpedicularity (Planar Zone) | ⊥ X.XXX | Parallel Planes |
| Perpedicularity (Cylindrical Zone) | ⊥ ⌀X.XXX | Cylinder |
| Parallelism (Planar Zone) | ∥ X.XXX | Parallel Planes |
| Parallelism (Cylindrical Zone) | ∥ ⌀X.XXX | Cylinder |
| Position (Planar Zone) | ⌖ X.XXX | Parallel Planes |
| Position (Cylindrical Zone) | ⌖ ⌀X.XXX | Cylinder |
| Concentricity | ◎ X.XXX | Cylinder |
| Symmetry | = X.XXX | Parallel Planes |
| Circular Runout | ↗ X.XXX | Concentric Circles |
| Total Runout | ↗↗ X.XXX | Offset Surfaces |

Profile of a line and profile of a surface characteristics can define a single-sided tolerance, in which case only one zone boundary, i.e., one offset surface, is illustrated to define the tolerance zone.

The foregoing embodiments of the present invention are provided as exemplary embodiments and presently known best modes for carrying out the invention. Modifications of these embodiments will be readily apparent to those of ordinary skill in the art. The invention is not intended to be limited by the foregoing embodiments, but instead is intended to be limited only by the appended claims.

The invention claimed is:

1. A graphical representation of a feature and associated tolerance, comprising:
   memory storing a description of the feature including at least one nominal dimension of the feature and an associated tolerance;
   a display device; and
   presented to a user on the display device, a graphical representation of the nominal definition of the feature and a plurality of graphical representations of a plurality of tolerance zones defined by and complying with the associated tolerance, derived from the nominal definition of the feature, the plurality of graphical representations being illustrated on the display device sequentially, with the graphical representation of the nominal definition of the feature, to animate the tolerance zones.

2. The graphical representation of claim 1, wherein the graphical representation of the tolerance zones includes an offset surface offset from a surface of the graphical representation of the nominal definition of the feature.

3. The graphical representation of claim 2, wherein an offset of the offset surface relative to the feature represents a tolerance associated with the feature.

4. The graphical representation of claim 1, further comprising a graphical representation of a datum simulator simulating a datum reference included in the associated tolerance.

5. The graphical representation of claim 1, wherein the graphical representation of the tolerance zones comprises a plurality of representations of tolerance zones complying with the associated tolerance.

6. The graphical representation of claim 5, wherein the plurality of representations are illustrated to the user one-at-a-time to animate the tolerance zone shape and positions.

7. The graphical representation of claim 6, wherein a representation of at least one of a datum simulator and a trihedron representing an axis system is included with each of the plurality of representations of tolerance zones, the representation of the at least one of the datum simulator and the trihedron being different for each of the plurality of representations of the tolerance zones and being illustrated to the user one-at-a-time to animate movement thereof with the tolerance zones.

8. The graphical representation of claim 1, wherein the tolerance has a numerical value and at least one of a geometric characteristic and a material modifier.

9. The graphical representation of claim 8, wherein the material modifier is one of a least material condition, a maximum material condition, and a regardless of feature size condition.

10. The graphical representation of claim 2, wherein the graphical representation of the offset surface represents to a viewer the effects of a material modifier included in the tolerance.

11. A method of graphically depicting geometric tolerancing constraints of a considered feature of a part comprising:
    graphically representing the part on a display device including a tolerance zone of a considered feature of the part based on dimensions and tolerances of the part stored in computer memory,
    appending a first reference datum with respect to which the considered feature is toleranced, wherein the first reference datum is displayed on the display device in a graphical form as a first datum simulator overlying the graphically represented part,
    animating the considered feature's tolerance zone with respect to the part on the display device by exemplary amounts though a plurality of degrees of freedom that are unconstrained by the first reference datum,
    appending a second reference datum with respect to which the considered feature is toleranced, wherein the second reference datum is displayed on the display device in a graphical form of a second datum simulator overlying the graphically represented part and wherein the tolerance with respect to the second reference datum provides for constraining at least one of the plurality of degrees of freedom that are not constrained by the first reference datum, and
    animating the considered feature's tolerance zone with respect to the part on the display device by exemplary amounts through one or more remaining degrees of freedom that are unconstrained by the first and second reference datums.

12. The method of claim 11 in which the steps of animating include animating at least one of the first and second datum simulators together with the considered feature's tolerance zone.

13. The method of claim 12 in which the steps of animating include animating the first datum simulator together with the considered feature's tolerance zone through the plurality of degrees of freedom that are unconstrained by the first reference datum and animating the second datum simulator together with the considered feature's tolerance zone through the one or more remaining degrees of freedom that are unconstrained by the first and second reference datums.

14. The method of claim 11 including the step of storing, in the computer memory, nominal dimensions of the part and the considered feature of the part, and tolerance information associated with the considered feature with respect to each of the first and second reference datums.

15. The method of claim 11 in which at least one of the first and second reference datums is one of a surface, an axis, and an edge.

16. The method claim 15 in which at least one of the first and second reference datums is a planar surface depicted on the display device as one of the first and second datum simulators in the form of a plane, and the planar surface reference datum constrains the considered feature's tolerance zone to translations along directions within the plane and rotation about an axis normal to the plane.

17. The method of claim 16 in which the planar surface reference datum corresponds to an intended surface of the part.

18. The method of claim 16 in which the other of the first and second reference datums is a cylindrical surface depicted on the display device as the other of the first and second datum simulators in the form of a cylinder, and the cylindrical surface reference datum further constrains the considered feature's tolerance zone to rotations about an axis of the cylinder coincident with the axis normal to the plane.

19. The method of claim 11 in which the tolerance zone provides limitations of at least one of location and orientation.

20. The method of claim 19 including varying a depiction of the tolerance zone displayed on the display device with a variation of the considered feature in accordance with a different tolerance.

21. The method of 19 including varying a depiction of at least one of the first and second datum simulators displayed on the display device in accordance with a different tolerance.

22. The method of claim 11 in which the considered feature has a size subject to a tolerance and a location subject to a tolerance and a depicted variation in one of the size and location tolerances is associated with a depicted variation in the other of the size and location tolerances.

23. The method of claim 11 including a step of displaying a Feature Control Frame defining characteristics of the considered feature.

24. The method of claim 23 including a step of matching the depiction of the considered feature's tolerance zone in accordance with a material condition modifier.

25. The method of claim 11 in which said exemplary amounts by which the considered feature's tolerance zone is moved are limited by at least one of the overall size of the part and the viewable area of the display.

26. The method of claim 11 further comprising the steps of displaying a trihedron representing a location and orientation of at least one of the first and second reference datums and moving the trihedron by amounts corresponding to the animation of one or more of the datum simulators and the tolerance zone.

27. The method of claim 11 in which the part together with the tolerance zone and first and second datum simulators are displayed pictorially.

28. The method of claim 11 in which the considered feature is one of a plurality of considered features having a collective tolerance with respect to one of the first and second reference datums and at least one of the steps of animating includes collectively moving a plurality of considered features' tolerance zones by exemplary amounts though one or more of the degrees of freedom that are unconstrained.

* * * * *